United States Patent [19]
Booher

[11] 3,880,475
[45] Apr. 29, 1975

[54] ANTI-SKID SYSTEM
[75] Inventor: Harold R. Booher, Boardman, Ohio
[73] Assignee: The Goodyear Tire & Rubber Company, Akron, Ohio
[22] Filed: Dec. 7, 1973
[21] Appl. No.: 422,843

Related U.S. Application Data
[63] Continuation of Ser. No. 239,025, March 29, 1972, abandoned.

[52] U.S. Cl. .............. 303/21 BE; 303/20; 244/111
[51] Int. Cl................................................ B60t 8/12
[58] Field of Search ....... 188/181; 244/111; 303/20, 303/21; 307/10 R; 317/5; 324/161–162; 340/62, 262

[56] References Cited
UNITED STATES PATENTS
3,574,426  4/1971  Ruof ............................. 303/21 EB
3,652,133  3/1972  Yamazaki et al. ............ 303/21 CG
3,701,569  10/1972 Arai et al. ...................... 303/21 BE
3,768,872  10/1973 Urban et al. .................... 303/21 BE Primary Examiner—Trygve M. Blix
Assistant Examiner—Stephen G. Kunin
Attorney, Agent, or Firm—Oldham & Oldham

[57] ABSTRACT
An anti-skid control system for a two main wheel aircraft wherein, fundamentally, the system comprises three separate but interrelated circuits. The first such circuit detects incipient skids and causes a corresponding slight reduction in hydraulic brake pressure. A second circuit detects deep skids and correspondingly directs a full dump of brake pressure while directing a modulator to gradually increase the brake pressure back toward the skid level. A third circuit detects a total locked wheel condition and directs a subsequent total release of brake pressure. The anti-skid control system operates in conjunction with the commonly known pilot-metered brake valve type assembly.

8 Claims, 16 Drawing Figures

ANTI-SKID SYSTEM

This is a continuation of application Ser. No. 239,025, filed Mar. 29, 1972, now abandoned.

The present invention relates to an anti-skid brake control system and particularly to such a system for use on a main wheel aircraft.

The control system of the present invention is of the type in which wheel speed is sensed and a skid detected as a sudden drop in wheel speed which causes the anti-skid control system to release brake pressure counteract the skid. The brake pressure is immediately reapplied but at a slightly lower level to achieve maximum braking efficiency without skidding. On two main wheel aircraft the wheels rotate at different velocities during turning maneuvers. In order to achieve maximum braking efficiency on such an aircraft, this variation in wheel rotational velocity during turning maneuvers must be taken into consideration.

It is the primary object of the present invention to provide a brake control system which is capable of controlling the brakes so as to provide maximum non-skidding braking effort in a smooth manner.

It is also an object of the present invention to provide an anti-skid brake control system which is adapted for use on a two main wheel aircraft and which operates to provide braking action at maximum efficiency commensurate with steering ability.

Yet another object of the present invention is the provision of an anti-skid control system which is capable of compensating for variations in runway coefficient.

As will be discussed more fully below, the present invention achieves these and other objectives by providing a brake control system which consists, essentially, of a wheel speed transducer for each of the left and right wheels of the aircraft which generate signals proportional in frequency to the wheel rotational velocity, a deceleration detector circuit and a skid detector circuit for each generator receiving the speed proportional signal, a modulator circuit receiving the output signals of the deceleration and skid detector circuits and controlling a valve to regulate brake pressure in accordance with the signals, and a logic circuit responsive to a locked wheel condition or a bounced landing to temporarily override the normal control of the brakes.

For a more complete understanding of the invention and the objects and advantages thereof reference should be had to the following detailed description and the accompanying drawings wherein there is shown a preferred embodiment of the invention.

Figure 1:
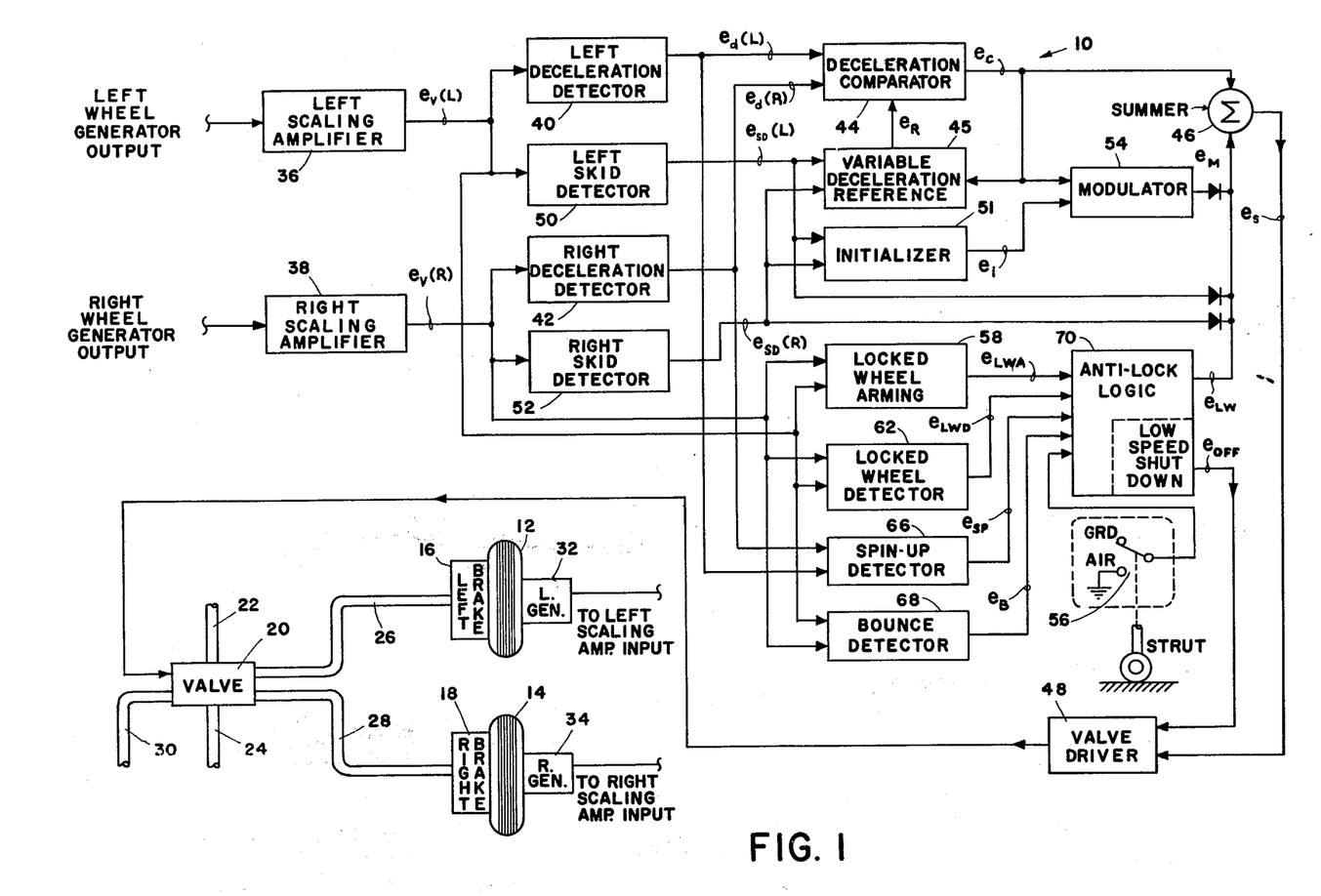
FIG. 1 is a highly schematic showing of the brake control system of the present invention.

The brake control system of the present invention, designated generally by the reference numeral 10, is adapted for use in controlling the brakes of a two main wheel aircraft. The left wheel 12 and right wheel 14 of the aircraft are each provided with a brake 16, 18, respectively. Pilot metered brake pressure through conduits 22 and 24, a two stage anti-skid control valve 20, and conduits 26 and 28, respectively. The valve 20 is responsive to the anti-skid control system 10 and effects proportional control of the pressure applied to the two brakes in a manner described below.

The main source of information for the anti-skid system 10 is wheel rotational velocity. This information is provided by wheel-driven generator 32 and 34 (See FIG. 1) which provide a DC voltage output that is directly proportional to wheel rotational velocity. If at any time either brake produces more torque than can be supported by the tire-ground coefficient of friction ($\mu$) or the existing wheel load, the resulting skid produces a reduction in the velocity signal of the affected wheel. This reduction is detected by the antiskid control circuit 10 which produces a signal that is sent to the anit-skid valve 20 causing brake pressure to be reduced just enough to correct the skid condition. Brake pressure is then reapplied to a level just below the point which caused the skid and is allowed to increase at a controlled rate until another skid is produced or until it reaches the pilot metered level. Though only one wheel may be skidding, both braked wheels receive the same percentage reduction in brake pressure so that a differential braking effort is preserved even during antiskid operation. In this manner, braking efficiency and steering stability are maintained for all braking conditions.

Wheel rotational speed is monitored by the wheel driven generators 32 and 34. The DC voltage output of each generator, which is proportional to wheel speed, is presented to the input of the scaling amplifier; left generator output to left scaling amplifier 36 and right generator output to right scaling amplifier 38. The scaling amplifiers serve to filter electrical noise from the generator signal and to scale the signal down proportionally so that it is within the operating range of the electronic control circuit. The output of scaling amplifiers 36 and 38 is, then, a clean DC voltage signal that is proportional to wheel rotational speed. The left scaled velocity signal shall be referred to as $e_v(L)$ and the right sealed velocity signal as $e_v(R)$.

The velocity signals $e_v(L)$ and $e_v(R)$ are monitored by three groups of skid sensing circuits, each group sensitive to a different degree of skid severity. At the onset of a skid, when said skid is barely perceptable (incipient), the most sensitive group of skid sensing circuits, the shallow skid detector, detects this condition. This shallow skid detector is made of left deceleration detector 40, right deceleration detector 42, deceleration comparator 44, and variable deceleration reference 45.

Deceleration detectors 40 and 42 continuously monitor the instantaneous deceleration of both wheels and supply output signals $e_d(L)$ and $e_d(R)$, respectively, which are proportional to wheel deceleration, to deceleration comparator 44. The deceleration comparator 44 compares the incoming wheel deceleration signals $e_d(L)$ and $e_d(R)$ with a reference deceleration signal $e_R$ supplied by the variable deceleration reference circuit 45. An "incipient" skid is detected whenever either wheel deceleration signal $e_d(L)$ or $e_d(R)$ exceeds the reference deceleration signal $e_R$. When this occurs, deceleration comparator 44 sends a fixed-amplitude signal $e_C$ to summer circuit 46. Here the comparitor signal $e_C$ is added to whatever modulator signal $e_M$ exists at the time. (Operation of the modulator is explained below). The output of the summer circuit 46, $e_S$, is proportional to the sum of deceleration comparator output $e_C$ and modulator output $e_M$, and is applied to valve driver circuit 48. This circuit converts the voltage signal $e_S$ into a current signal which is proportional to $e_S$. Current signal $i_v$ is applied to anti-skid valve 20 causing the valve 20 to reduce brake pressure by a percentage amount that is proportional to valve current signal $i_v$. For incipient skid conditions where only the shallow skid detector circuits are in operation, the brake pressure is reduced by a small amount since only a slight reduction is needed for correction of shallow or incipient skid.

If the slight pressure reduction caused by the shallow skid detectors is not enough to arrest the skid in its beginning, the deep skid detector circuit detects the skid when the skidding wheel velocity drops approximately 12 mph below the ground speed of the aircraft.

The deep skid detector is made up of left skid detector circuit 50 and right skid detector circuit 52. Whenever a wheel velocity sinks approximately 12 mph below the aircraft ground speed the skid detector that is monitoring the affected wheel will send a fixed amplitude signal, $e_{SD}(L)$ or $e_{SD}(R)$, directly to the summer circuit 46. This signal is of such amplitude as to cause maximum output from summer 46. This results in a complete release of brake pressure for as long as the skid lasts.

Operation of the shallow and deep skid detectors results in rapid changes of brake pressure necessary to provide fast and efficient skid correction. These rapid pressure excursions cause corresponding changes in the brake drag forces that act at the brake at the end of the strut. Since the strut is like a stiff spring, these brake drag force variations result in flexing of the strut. The strut motion manifests itself as variations in the wheel velocity signals. Although the strut motion damps out quickly, it is important that the resulting variations in wheel speed not be interpreted as shallow skids thereby causing unnecessary brake pressure reduction. To prevent this from happening, the variable reference deceleration circuit 45 monitors the outputs of the deep skid detectors 50 and 52 and the output of the deceleration comparator 44. Whenever the output signal of one detector circuit appears then disappears, a skid correction is indicated. At the instant that signal disappears, indicating that the skid condition is over, the variable deceleration reference circuit 45 temporarily desensitizes itself enough so that the small strut "twang" resulting from the post skid brake pressure reapplication does not generate false skids. In this manner, only true skids are detected.

Whenever a skid has been arrested, the output of the deep skid detector and shallow skid detector circuits disappear. This leaves only the modulator circuit 54 output signal $e_M$ present at the input to summer circuit 16. As a result, brake pressure is caused to return to the level commanded by the modulator circuit 54. This circuit functions to establish the level of brake pressure, after a skid correction "dump", to a level just below that which caused the previous skid.

At the onset of skid activity, the modulator receives a signal $e_i$ from the initializer circuit 51. This circuit functions to raise the modulator level $e_M$ quickly to approximately the level that will maintain brake pressure just below the skid level. This rather coarse adjustment is made in response to operation of either deep skid detector circuit 50 or 52. Several deep skids occurring close together will cause the initializer 51 to increase the modulator level $e_M$ by a fixed amount (approximately 20% of maximum output) each time a deep skid occurs until the modulator level, thus adjusted, causes brake pressure to be reapplied below the skid point. When deep skid detector operation ceases, the initializer circuit output $e_i$ disappears leaving the modulator properly initialized. The modulator level then decays causing brake pressure to slowly increase at a controlled rate until the skid point is found, as evidenced by operation of the shallow skid detector. If this skid point is not reached within approximately 0.25 seconds, the modulator level, $e_M$ begins decaying at a much higher rate so as to cause the brake pressure to increase rapidly to the new skid point. When this point is reached, the shallow skid detector will function to relieve the incipient skid. The resulting operation of the deceleration comparator circuit 44 causes the modulator level $e_M$ to increase by a small fixed amount. In this manner brake pressure is reapplied, after the incipient skid is corrected to a point just below the skid level and caused to rise slowly back toward the incipient skid point. It is only by knowing where this incipient skid point is, that the modulator circuit 54 can establish what the maximum usable level of brake pressure is for the existing runway conditions. The modulator samples the runway friction coefficient approximately 4 times per second by inducing incipient skids, then reapplying pressure just below the level where the incipient skid occurred. If the runway braking conditions suddenly improve or degrade, the modulator will adapt to the new level of braking in less than 0.5 seconds. In this manner maximum use is made of the existing runway braking conditions even though they may be changing rapidly.

Under the worst braking conditions, glare, ice or standing water, a wheel may not completely recover from a skid before pressure is reapplied at the brake. This is due to the fact that the spin-up forces that cause the skidding wheel to spin up from a skid are extremely low. Under these conditions successive skids may cause a wheel to "ratchet" into a locked-up condition. To prevent this from happening, the last group of skid sensing circuits, the locked wheel detector, senses this most severe type of skid.

The locked wheel detector is made up collectively of the locked wheel arming circuit 58, locked wheel detector circuit 62, spin-up detector circuit 66, and anti-lock logic circuit 70.

A locked wheel condition is sensed by the locked wheel detector circuit 62 whenever either wheel velocity sinks below 10 mph. Whenever this happens, the locked wheel detector circuit 62 sends a fixed level signal $e_{LWD}$ to the anti-lock logic circuit 70 warning of the locked condition. To prevent low speed taxiing from being interpreted as a locked wheel condition, locked wheel arming detector 62 serves to prevent locked wheel detection at aircraft ground speeds below 20 mph. This circuit monitors both wheel velocities such that if either wheel speed is above 20 mph, a signal $e_{LWA}$ is supplied to the input of anti-lock logic circuit 70. Thus if one wheel sinks below 10 mph while the other is above 20 mph, a real locked wheel is defined and anti-lock logic circuit 70 supplies an output signal $e_{LW}$ to the input of summer 46. Signal $e_{LW}$ is of such fixed amplitude as to cause anti-skid valve 20 to fully release brake pressure allowing the locked wheel to spin up. As soon as the affected wheel spins up through 10 mph, locked wheel detector output $e_{LWD}$ will disappear. To prevent premature reapplication of brake pressure, the spin-up detector circuit 66 monitors the acceleration of wheel spin-up so as to supply an output signal $e_{SP}$ to anti-lock logic circuit 70 which causes the locked wheel pressure dump to be extended until the affected wheel completely spins up to aircraft synchronous speed.

The 10 mph differential that exists between the locked wheel detection speed of 10 mph and the locked wheel arming speed of 20 mph also prevents turning maneuvers from generating false locked wheel signals. (In a turn, the inside wheel is rotating at a slower speed than the outside wheel). Thus, differential braking can be maintained in a turning maneuver.

The anti-lock circuit 70 uses its input information to prevent inadvertant pilot application of brake pressure prior to touchdown. It is imperative that no brake pressure be present at touchdown that might prevent wheel spin-up resulting in blown tires. Prior to touchdown, both wheel velocities are zero causing locked wheel detector circuit 62 to supply an output signal $e_{LWD}$ warning the anti-lock logic circuit 70 that one or both wheel velocities are below 10 mph. Since the locked wheel arming signal $e_{LWA}$ is not present (both wheel speeds are below 20 mph) the anti-lock logic must be able to tell whether the aircraft is on the ground and stopped, in which case no brake pressure release is required; or that the aircraft is airborne, in which case a full release of brake pressure is required to insure wheel spin-up at touchdown. This information is supplied by the ground sensing switch 56 which tells the anti-lock logic 70 when the aircraft is airborne or on the ground. Thus when the aircraft is airborne and wheel velocities are under 10 mph the anti-lock logic 70 acts to supply a full brake release signal to the summer circuit 46. At touchdown, the locked wheel signal $e_{LWD}$ will disappear as soon as both wheels spin-up through 10 mph and the ground sensing switch may change to the "ground" position at anytime after touchdown. Therefore, to prevent loss of the "touchdown protection" brake pressure dump prior to full spin-up of both wheels, the output signal $e_{SP}$ of the spin-up detector circuit 66 is utilized to inform the anti-lock logic circuit 70 that either wheel is spinning up. In this manner, the brake pressure dump that is present prior to touchdown is extended after touchdown for as long as required for both wheels to fully spin up. When this is done, the spin-up detector signal $e_{SP}$ will disappear allowing the anti-lock logic 70 output $e_{LW}$ to drop out permitting pilot metered brake pressure to reach the brakes.

Sometimes a bounce occurs at touchdown. If it were not for the bounce detector circuit 68, a bounce could cause a partial spin-up of both wheels that would satisfy all of the touchdown requirements described above. This would permit pilot metered pressure (if it were present) to reach the brakes during the bounce. To prevent this, bounce detector 68 monitors the slowest wheel at touchdown. This circuit makes use of the fact that during most single bounce landings one or both wheels will not fully spin up due to the very short contact with the ground during the bounce. Until the slowest wheel has spun up through a preset reference velocity level (which is set near, but below, the minimum landing speed of the aircraft), the bounce detector circuit 68 supplies an output signal $e_B$ to the anti-lock logic circuit 70 causing its output signal $e_{LW}$ to remain through a bounce. After the bounce, spin-up begins again and the spin-up detector circuit 66 takes over again to maintain the anti-lock logic output $e_{LW}$ until full spin up occurs. After touchdown spin-up, the bounce detector circuit 68 is disabled so as not to interfere with subsequent anti-skid operation.

The anti-lock logic circuit 70 also provides an output $e_{OFF}$ which functions to disable the valve driver circuit 48 for aircraft speeds under 10 mph. This is done to prevent any possible anti-skid interference with low speed taxi maneuvers and parking. Although skid protection is lost below 10 mph, skids at this low speed will not damage tires. The locked wheel arming output $e_{LWA}$ and locked wheel detector output $e_{LWD}$ are used to inform anti-lock logic circuit 70 when aircraft speed is below 10 mph.

The various circuits comprising the anti-skid brake control system are illustrated in greater detail in FIGS. 2-6. In discussing those of the circuits which are duplicated for the left and right wheels, that is the scaling amplifiers and filter circuits, the deceleration detector circuits, and the skid detector circuits, only one of the two circuits will be described in detail. As will be seen from the drawings, the corresponding circuits for the other wheel are identical.

VELOCITY SCALING AMPLIFIER

Figure 2:
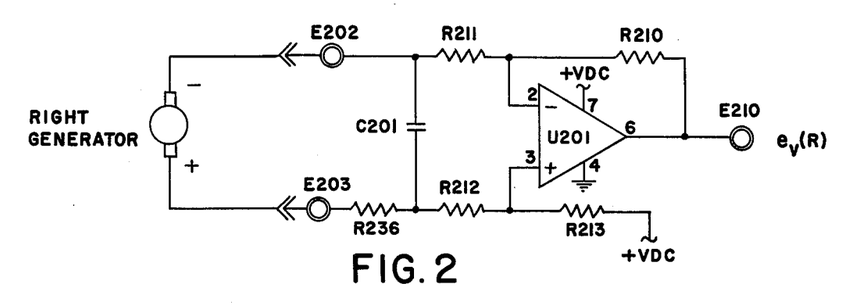
FIG. 2 is a schematic showing of the scaling amplifiers and filters of the control circuit of FIG. 1.

Referring now specifically to FIG. 2 the scaling amplifier and filter circuits 36 and 38 will be described. The left and right velocity scaling amplifiers function to filter the DC voltage output of either wheel driven generator and to scale this output so that it is within the operating range of anti-skid electronic circuitry. For purposes of discussion, the right scaling amplifier will be described.

The DC voltage output of the right wheel driven generator 34 is applied to terminals E202 and E203 with the polarity as shown in FIG. 2. Resistor R236 and capacitor C201 form a simple L-section filter to filter out generator brush noise. The filtered velocity signal is then applied to the input of a differential amplifier formed by R210-R213 and operational amplifier U201. The ratio of resistors R210 and R213 to R211 and R212 fix the gain of the amplifier at 0.5. At zero input reference level of 3.0VDC is established by the connection of R213 to the + 3VCD bus. Thus the scaled output appearing at terminal E210 will be $e_1(R) = (3.0 + e_{gen(R)}/2)$.

DECELERATION DETECTOR (RIGHT)

The right deceleration detector circuit 42 (FIG. 3) monitors the right scaled velocity signal $e_{v(R)}$ and provides an output signal $e_{d(R)}$ that is proportional to the instantaneous deceleration of the right wheel.

Figure 3:
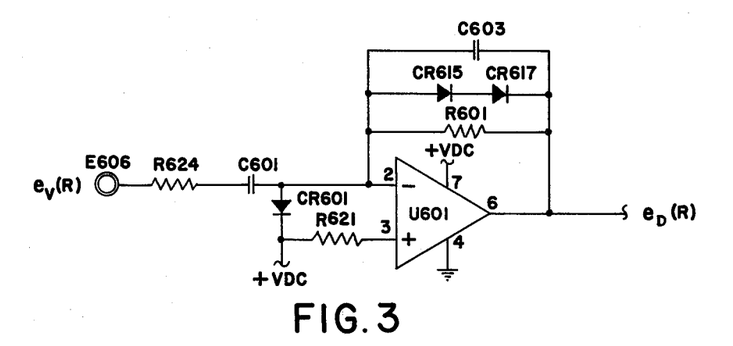
FIG. 3 is a schematic showing of the deceleration detector circuit of the control system of FIG. 1.

The basic deceleration detector is a differentiator circuit formed by capacitor C601, resistor R601, and operational amplifier U601. The ratio of the values of R601 to C601 determine the gain of the differentiator. Resistor R624 and capacitor C603 are filter elements that limit the high frequency response of the differentiator. Diodes CR601, CR615, and CR617 provide diode clipping to prevent saturation or "latch-up" of the operational amplifier U601. Resistor R621 provides input impedance matching for the non-inverting input of amplifier U601 and also references the differentiator output signal $e_{D(R)}$ at + 3.0VDC for a zero deceleration input level. Thus, the deceleration output signal $e_{D(R)} = 3.0 + k$, $(de_{v(R)}/dt)$ where $k$, is a constant of proportionality respresenting the gain of the stage.

SKID DETECTOR (RIGHT)

Figure 4:
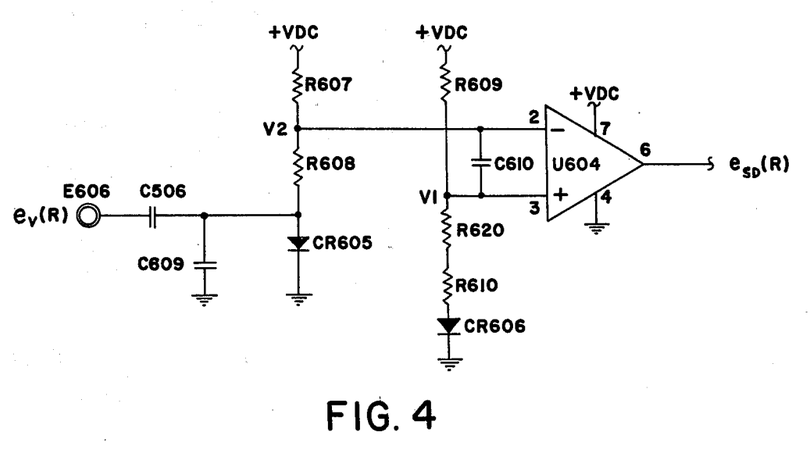
FIG. 4 is a schematic showing of the right skid detector circuit.

The right skid detector circuit 52, shown in FIG. 4, monitors the right scaled wheel velocity signal $e_{v(R)}$ for rapid downward departures indicative of a deep skid. When the downward departure exceeds a value proportional to approximately a 12 mph skid depth, skid detector circuit 52 supplies a fixed level output signal $e_{SD(R)}$ of 10–14 VDC.

To accomplish this function, operational amplifier U604 is used as a voltage comparator. The non-inverting (+) input monitors a fixed voltage reference level V1, determined by resistors R609, R620, and R610, and diode CR606. This level is slightly lower than the steady-state voltage level V2 monitored by the inverting (−) input of amplifier U604. Under steady-state conditions (constant wheel velocity), the output signal $e_{SD(R)}$ of amplifier U604 remains switched to its lowest level, about 1–3 VDC. The steady-state level of voltage V2 is determined by R607, R608, and CR605. Capacitor C506 couples variations of velocity signal $E_{V(R)}$ onto junction J1 (See FIG. 4). The relatively slow change of wheel velocity signal $e_{v(R)}$ during normal deceleration has little effect on the voltage at junction J1, and thus, voltage V2 remains at or near its steady state value. However, the rapid reduction of wheel velocity signal $e_{v(R)}$ that occurs during a deep skid, causes the voltage at junction J1 to be reduced a like amount due to the coupling effect of capacitor C506. A reduction of the voltage of J1 causes proportional reduction of voltage V2. A deep skid of approximately 12 mph causes voltage V2 to be lowered just below fixed voltage level V1. As soon as V2 goes lower than V1, amplifier U604 switches the output signal $e_{SD(R)}$ to its highest state (12–14 VDC). When the deep skid has been arrested and the affected wheel spins up to within 12 mph of the aircraft ground speed, voltage V2 is again higher than voltage V1 and amplifier U604 switches the output signal $e_{SD(R)}$ back to the low state (1–3 VDC).

DECELERATION COMPARATOR

Figure 5:
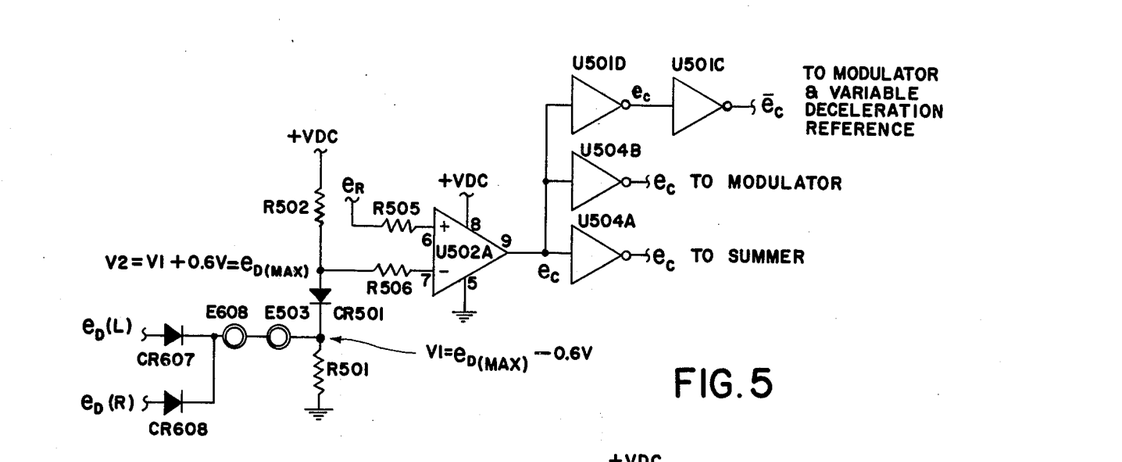
FIG. 5 is a schematic showing of the deceleration comparator circuit.

Deceleration comparator circuit 44 functions to compare the maximum wheel deceleration signal $e_{D(MAX)}$ to a reference deceleration signal $e_R$ supplied to the variable deceleration reference circuit 45. When the maximum deceleration signal $e_{D(MAX)}$ exceeds the reference signal $e_R$, the comparitor formed by amplifier U502A and resistor R505 and R506 switches the output signal from a high level (12–14 VDC) to a low level (1–3 VDC). The maximum deceleration signal is detected by the analog OR circuit formed by diodes CR607, CR608, CR501, and ressistor R501 and R502. As seen in FIG. 5, diodes CR607 and CR608 provide a signal V1 that is a diode drop below the maximum deceleration signal, $e_{D(L)}$ or $e_{D(R)}$ whichever is larger. Diode CR501 provides voltage V2 that is a diode level above V1 or V2 = $e_{D(MAX)}$. Resistors R501 and R502 provide diode bias current. Logic inverter, U501C, U501D, U504A, and U504B are used to convert the output amplifier U502A to true logic levels, i.e., low = OVDC and high = 15VDC and also to provide logic inversion as required of the output signal as required.

VARIABLE DECELERATION REFERENCE

Figure 6:
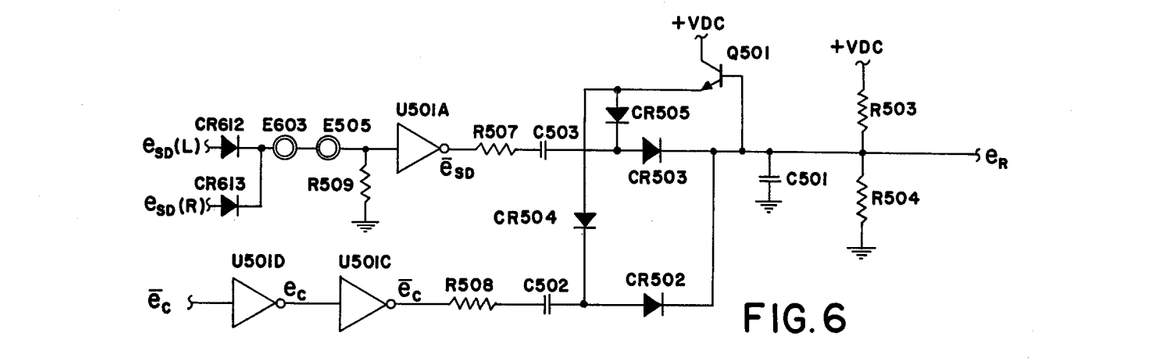
FIG. 6 is a schematic showing of the variable deceleration reference circuit.

Under static conditions, the reference deceleration signal $e_R$ is established by the voltage divider formed by resistors R503 and R504. Capacitor C501 charges to this level. When skid corrections occur, the reference deceleration level $e_R$ must be raised momentarily to reduce the sensitivity of the shallow skid detector so that resultant strut motion will not induce unnecessary shallow skid releases. This is accomplished by monitoring the output signals $e_{SD(L)}$ and $e_{SD(R)}$ of the skid detectors and $\overline{e}_C$ of the deceleration comparator and using these signals to trigger operation of a charge transfer circuit. The charge circuit transfer circuit is formed by capacitors C501-503, diodes CR502-505, transistor Q501, and resistors R507 and R508. Whenever a shallow skid occurs, the trailing edge of deceleration comparator output $\overline{e}_C$ is shaped by logic inverters U501C and U501D so that it is exactly 15 v in height and is then applied to the input of the charge transfer circuit formed by R508, C502, and CR502. The voltage level of C501 is caused to increase by an amount determined by the ratio of the value of C502 to C501 times the height of the input signal (+ 15VDC). If a second shallow skid occurs, $\overline{e}_C$ first goes to the low state (zero) during the skid. To prevent the negative going leading edge from reducing the charge level of C501, diode CR502 becomes back biased and diode CR504 and transistor Q501 conduct to supply current to C502 as a result of the negative-going leading edge of deceleration comparator signal $\overline{e}_C$. In this manner, the charge level C501 is caused to raise an increment only be the trailing edge of the deceleraion comparitor output signal $\overline{e}_C$. Capacitor C501 thus raised in voltage, decays through resistor R504 back toward its original steady-state level. Operation of either skid detector causes the charge on capacitor C506 to increase in a like manner except that charge is transfered through resistor R507 and capacitor C503. The level that voltage on capacitor C506 is raised above its steady-state level is dependent upon the frequency of the skid activity.

INITIALIZER

The initializing circuit 51 (FIG. 7) consists of three major sections: the input conditioner circuit, the step circuit, and the initialization clear clock.

Figure 7:
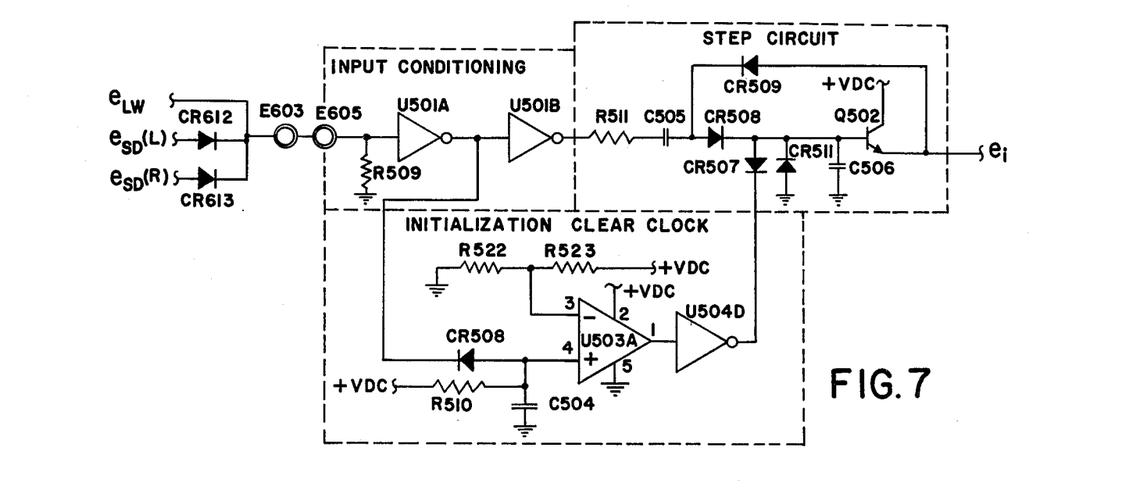
FIG. 7 is a schematic showing of the initializer circuit.

The input conditioner consists of inverters U501A and U501B, and resistor R509. Input signals from either skid detector or the locked wheel circuits are logic level outputs from operational amplifiers that must be converted to true logic levels. Inverters U501A and U501B convert an input low (1–3 VDC) to zero VDC and an input high (12–14 VDC) to 15 VDC. The true logic level outputs of these inverters are used to control the other two stages.

The step circuit operates on the charge transfer method described in the Variable Deceleration Reference section. When any of the input signals ($e_{SD(L)}$, $e_{SD(R)}$, $e_{LW}$) go to the high state indicating a skid, the inverter U501B switches from 0 VDC to +15 VDC. The +15 VDC leading edge of this signal is coupled through R511, C505 and CR508 to C506. The charge level of C506 is raised by an increment of voltage equal to the ratio of C505 to C506 times the height of the leading edge of the signal. Each time U501B switches to the high state (indicating a deep skid) the voltage of C506 is raised an equal increment. Diode CR508 prevents the negative-going edge of the U501B output from stealing back the charge just transferred on to C506. Instead capacitor C505 recovers its charge through CR509 and Q502 which buffer C506. Since there is no discharge capacitor around C506, the voltage level between skids decays very little. The initialization clear clock is provided for this purpose. Each incoming skid causes inverter U501A to switch to the zero state for the duration of the skid. This causes capacitor C504 to be discharged through diode CR508. When the deep skid signal disappears U501A returns to the high state (+15 VDC) thus back biasing CR508. Capacitor C504 now begins to charge through resistor R510. If another skid does not occur within approximately 0.2 seconds, capacitor C504 will charge above the voltage level appearing at the inverting (−) input of amplifier U503A (The level is set by the divider action of R524 and R525). At this time the output of amplifier U503A will switch from a low state (1–3 VDC) to a high state (12–14 VDC) causing inverter U504D to switch to its low state (0 VDC) thus discharging capacitor C506 through diode CR507. The initialization circuit output signal $e_i$ now becomes zero and will remain zero until another deep skid occurs.

MODULATOR

The modulator circuit 54 (FIG. 8) consists of three basic sections: a step circuit, a fast adapt clock circuit, and a buffer amplifier circuit.

Figure 8:
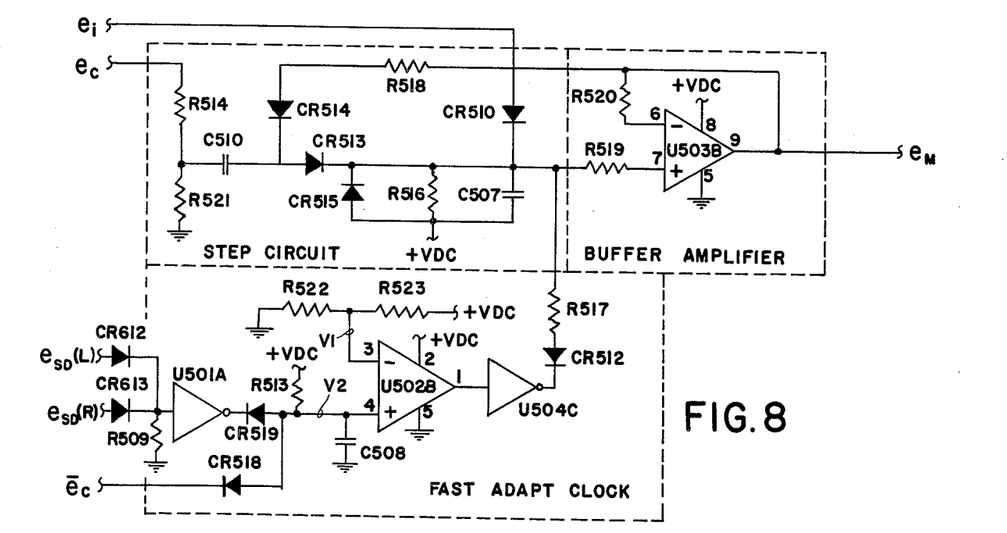
FIG. 8 is a schematic showing of the modulator circuit.

The purpose of the step circuit is to regulate the voltage level of capacitor C507 as a function of skid activity, is, the more frequently skids occur, the higher the voltage level of C507. This circuit usually begins to operate after C507 has been initialized to a level $e_i$ through diode CR510 (as explained in the previous section). The step circuit receives as its input, the modulator comparator output signal $e_C$. This signal is a positive-going 15 VDC pulse that occurs whenever a shallow skid is detected. The pulse amplitude is scaled down by the voltage divider formed by resistors R514 and R521. The scaled pulse is applied to the input side of capacitor C510. The leading edge of this pulse causes a charge transfer through C510 and CR513 into C507. (This type of operation has been described in the Initializer section and the Variable Deceleration Section). The trailing edge of the scaled pulse transfers no charge from C507 because buffering amplifier U503B provides recovery current for capacitor C510 through diode CR514 and resistor R518 while diode CR513 prevents current flow from C507 into C510. Each pulse signal $C_c$ (representing a shallow skid) causes an incremental voltage increase on capacitor C507. Between pulses, resistor R516 provides a slow decay of the voltage MC507.

If capacitor C507 decays through R516 for more than 0.25 second before another voltage increment is received, the fast adapt dock functions to increase the decay ratio by more than five times the slow rate. The rapid decay is provided through resistor R517 and diode CR512 when inverter U504C switches its output from a high state of 15 VDC to a low state of 0 VDC. This switching action occurs as a result of the clock circuit, formed by voltage comparator U502B, resistors R513, R522, R523 and capacitor C508, completing its timing function. Whenever a skid detector signal, $e_{SD(L)}$ or $e_{SD(R)}$, or the inverted deceleration comparator output signal $\bar{e}_c$ is received at the input of the clock, capacitor C508 is discharged to zero through diodes CR518 and CR519 and inverter U501A. As long as these signals (indicating a shallow or deep skid) are present, capacitor C508 remains discharged so that the voltage V2 at the non-inverting (+) input of voltage comparator U502 is lower than the fixed voltage level V1 at the inverting (−) input. (This voltage level is determined by the voltage divider formed by resistors R522 and R523). When no skid signals are present, $e_{SD(L)}$ and $e_{SD(R)}$ are at a zero level causing inverter U501A to switch high and back bias diode CR519. Also $\bar{e}_c$ is at a high level (+ 15 VDC) back biasing diode CR518 so that now capacitor C508 begins to charge through resistor R513. The RC time constant is such that the voltage V2 on C508 reaches the same level as the fixed voltage V1 in approximately 0.25 second causing voltage comparator U502B to switch from a low state to a high state which, in turn, switches inverter U504C from a high state to a low state causing rapid discharge of C507 to begin. The fast-adapt clock is reset whenever a shallow or deep skid occurs.

SUMMER

Figure 9:
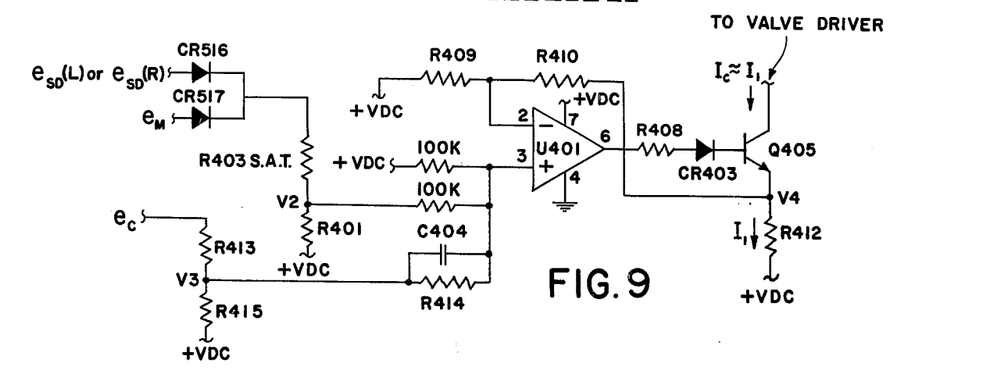
FIG. 9 is a schematic showing of the summer circuit.

The function of the summer circuit 46 is to scale and add the deceleration comparator output signal $e_C$ to the scaled outputs of the modulator ($e_M$) or the skid detectors ($e_{SD(L)}$ or $e_{SD(R)}$) whichever is greater. Diodes CR516 and CR517 (FIG. 9) provide an analog OR function to apply the greater of the two signals, $e_C$ or $e_M$, to the voltage divider formed by resistors R403 and R401. This voltage divider scales the input signal to provide a scaled voltage V2 at the input of summing resistor R402. In the same manner, deceleration comparator signal $e_C$ is scaled by resistors R413 and R415 to provide scaled voltage V3 at the input of summing resistor R414. Scaled voltages V2 and V3 are summed by the summing network formed by resistors R414, R402, R404 and capacitor C404c provide a voltage proportional to the sum at the (+) input of amplifier U401. This signal is amplified by a factor determined by the ratio of the feedback resistors R409 and R410 and is caused to appear as V4 on resistor R412 (Since the feedback resistor is connected to this point). Thus, V4 = $k$ (V1 + V2) where $k$ is the gain of the summing stage. Resistor R408, diode CR403, and transistor Q405 have no effect on the summing function since they are no the output side of amplifier U401 and inside the feedback loop. Resistor R408 and diode CR403 prevent leading of the output of U401. Transistor Q405 and resistor R412 form a voltage-to-current converter. Summing voltage V4 appearing across resistor R412 defines a current $I_1$ signal to the voltage V4 divided by the resistance R412. Practically all of this current is supplied by transistor Q405 so that collector currrent $I_C \cong I_1$. This current is used to control the valve driver circuit 48.

VALVE DRIVE

Figure 10:
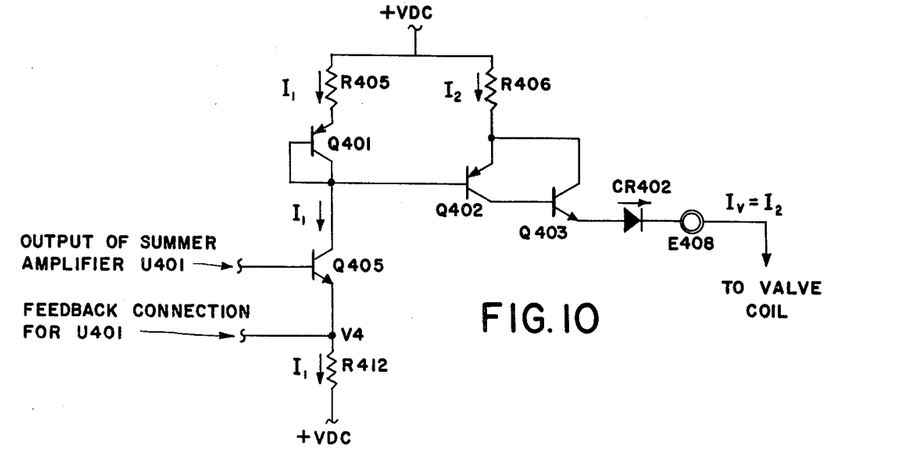
FIG. 10 is a schematic showing of the valve driver circuit.

The current $I_1$ defined by the output voltage of the summing circuit 46 is amplified by the valve driver circuit 48 consisting of transistors Q405 and Q406, and resistors R405 and R406, and diode CR402 to provide an output current signal $I_r$ that is proportional to input current $I_1$ and, consequently, proportional to the summing voltage V4.

The voltage-to-current conversion provided by Q405 and R412 (described above) provides current signal $I_1$ that is proportional to voltage signal V4. This same current flows through transistor Q401 and resistor R405 so that the voltage drop appearing across R405 is equal to the current $I_1$ times the resistance R405. The base current of Q402 is so small that it can be neglected. Transistor Q401 has been connected to act as a diode to compensate for the junction drop occurring across transistor Q402. The result is that the same voltage drop that appears across resistor R405 is caused to appear across resistor R406. Since the value of R406 is less than that of R405, current $I_2$ will be greater than $I_1$ by a factor equal to the ratio of R405 to R406. Current $I_2$ flows through transistors Q402 and Q403 and diode CR402 to drive valve (20). Transistors Q402 and Q403 are connected as a complimentary pair to provide enough current gain so that the base current of Q402 can be neglected when compared to current $I_1$.

LOCKED WHEEL ARMING

Figure 11:
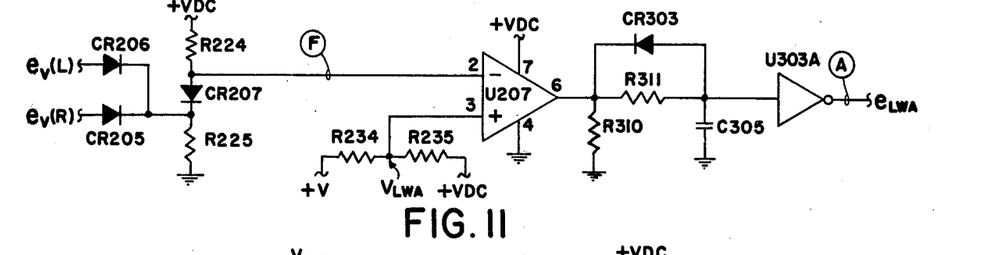
FIG. 11 is a schematic showing of the locked wheel arming circuit.

An analog OR circuit consisting of resistors R225 and R224, and diodes CR205–207, selects the maximum scaled wheel velocity signal $e_{V(L)}$ or $e_{V(R)}$, whichever is greater and applies this signal F to the non-inverting (+) input of voltage comparator amplifier U207. (The operation of an analog OR circuit is explained in the Deceleration Comparator Section). Resistors R234 and R235 form a resistor divider to establish fixed reference voltage $V_{LWA}$ at the inverting (−) input of U207. Whenever either scaled wheel velocity signal exceeds $V_{LWA}$, comparator amplifier U207 switches from a high state to a low state causing logic inverter U303A to switch from a "zero" state of a logic "1" state (+ 15 VDC). As long as either wheel velocity signal remains higher than $V_{LWD}$ (which corresponds to approximately 30 mph) the signal at A remains at a logic "1" level (+ 15 VDC). When both scaled wheel velocity signals are less than $V_{LWA}$, then the signal at F drops below $V_{LWA}$ causing amplifier U207 to switch to its high state (12–14V). However, a delay circuit made up of resistors R310 and R311 and capacitor C305 causes the signal at the input of logic inverter U303A to rise slowly so that inverter U303A switches to a logic "0" level (0 VDC) approximately 0.3 seconds after amplifier U207 switches to its low state, the delay circuit is bypassed by diode CR303 and logic inverter U303A switches immediately to a logic "1" level.

LOCKED WHEEL DETECTOR

Figure 12:
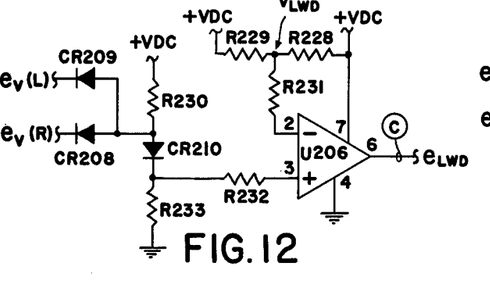
FIG. 12 is a schematic showing of the locked wheel detector circuit.

An analog OR circuit, made up of diodes CR208-210 and resistors R230 and R233, applied the minimum scaled wheel velocity signal, $e_{V(L)}$ or $e_{V(R)}$, as signal G at the non-inverting (+) input of voltage comparator amplifier U206. A fixed reference voltage $V_{LWD}$ (corresponding to approximately 10 mph wheel speed) is established by voltage divider resistors R228 and R229 at the inverting (−) input of amplifier U206. If either wheel speed is under 10 mph, signal G will be less than $V_{LWD}$ and U206 will be switched to its "0" logic level (1-3 VDC). As long as either wheel remains below 10 mph, signal C will remain at the "0" level. If both wheels are above 10 mph, signal E will be greater than $V_{LWD}$ and U206 will be switched to its "1" level (12–14 VDC). Resistors R231 and R232 provide a balanced input impedance to amplifier U206.

SPIN-UP DETECTOR

Figure 13:
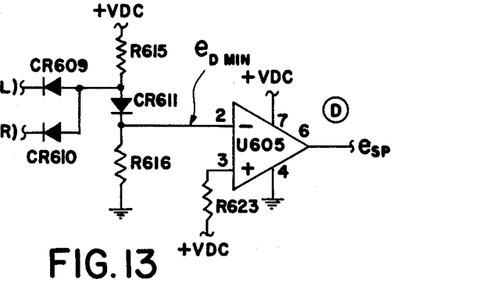
FIG. 13 is a schematic showing of the spin-up detector circuit.

An analog OR circuit consisting of diodes CR609 and CR610 establishes the minimum deceleration signals, $e_{D(L)}$ or $e_{D(R)}$, as $e_{DMIN}$ on the inverting input of voltage comparator amplifier U605. The non-inverting (+) input is connected to the +3 VDC line through resistor R623. From the table on FIG. b, it is evident that $e_{DMIN}$ can only be less than 3 VDC if either or both wheels are accelerating (spinning-up) since zero deceleration level equals 3 VDC. When $e_{DMIN}$ is less than 3 VDC, amplifier U605 switches to its "1" state (12–14 VDC) and stays there as long as any wheel is accelerating. When neither wheel is accelerating, the output of U605 to its "zero" state (1–3 VDC).

BOUNCE DETECTOR

Figure 14:
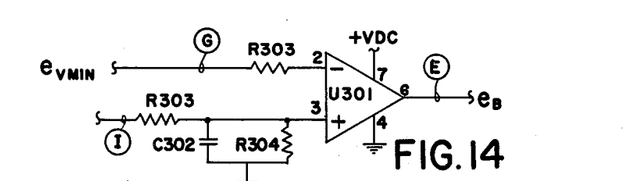
FIG. 14 is a schematic showing of the bounce detector circuit.

Prior to touchdown, the strut switch 56 is in the airborne position and causes the anti-lock logic 70 to supply a signal I to the bounce circuit. This signal I is at the logic "1" level (+ 15 VDC) and remains at that level until after the aircraft touches down and both wheels have spun-up through 10 mph. Prior to touchdown, capacitor C302 has charged to a level determined by voltage divider resistors R303 and R304 and appears at the non-inverting (+) input of voltage comparator U301. This level corresponds to a wheel velocity of approximately 130 mph. The minimum scaled wheel velocity signal G appears at the inverting (−) input of U301. As long as signal E is less than the voltage level of C302, amplifier U301 remains switched to its "1" state (12–14 VDC). Upon landing, signal I goes to the "0" logic level (0 VDC) as soon as the slowest wheel spins up through 10 mph. The voltage on C302 begins to decay. If a bounce occurs at touchdown such that one of both wheels did not fully spin-up, output signal E remains in the "1" state until the aircraft touches down again and the slowest wheel velocity signal spins up beyond the level of the voltage on C302. At this time, the output of U301 switches to its "0" state (1–3 VDC).

ANTI-LOCK LOGIC

Figure 15:
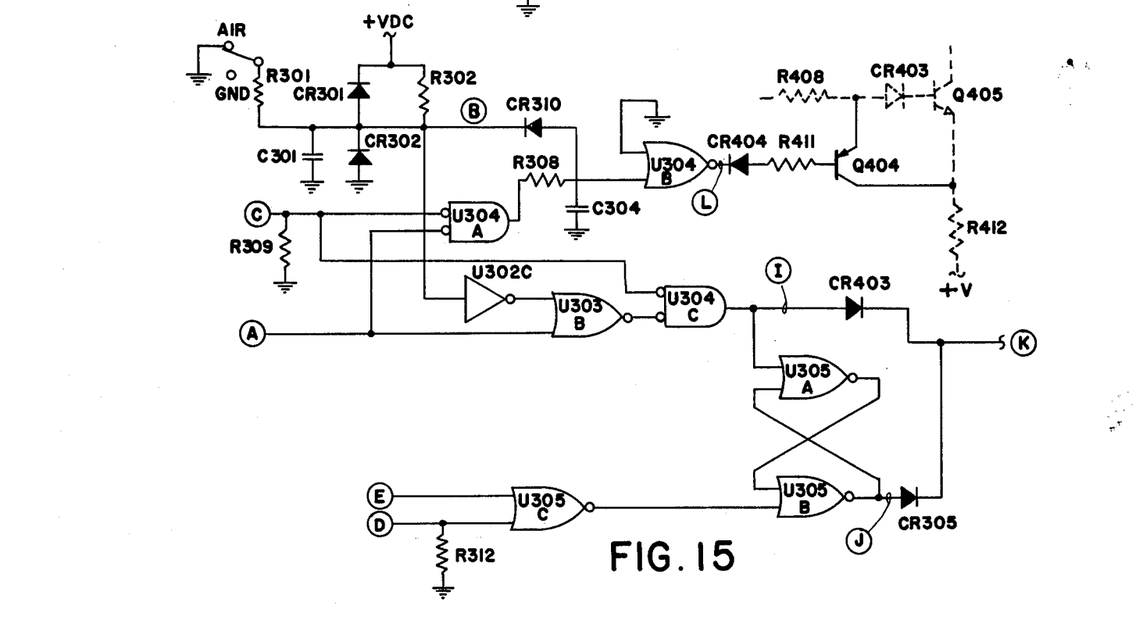
FIG. 15 is a schematic showing of the anti-lock logic circuit.
Figure 16:
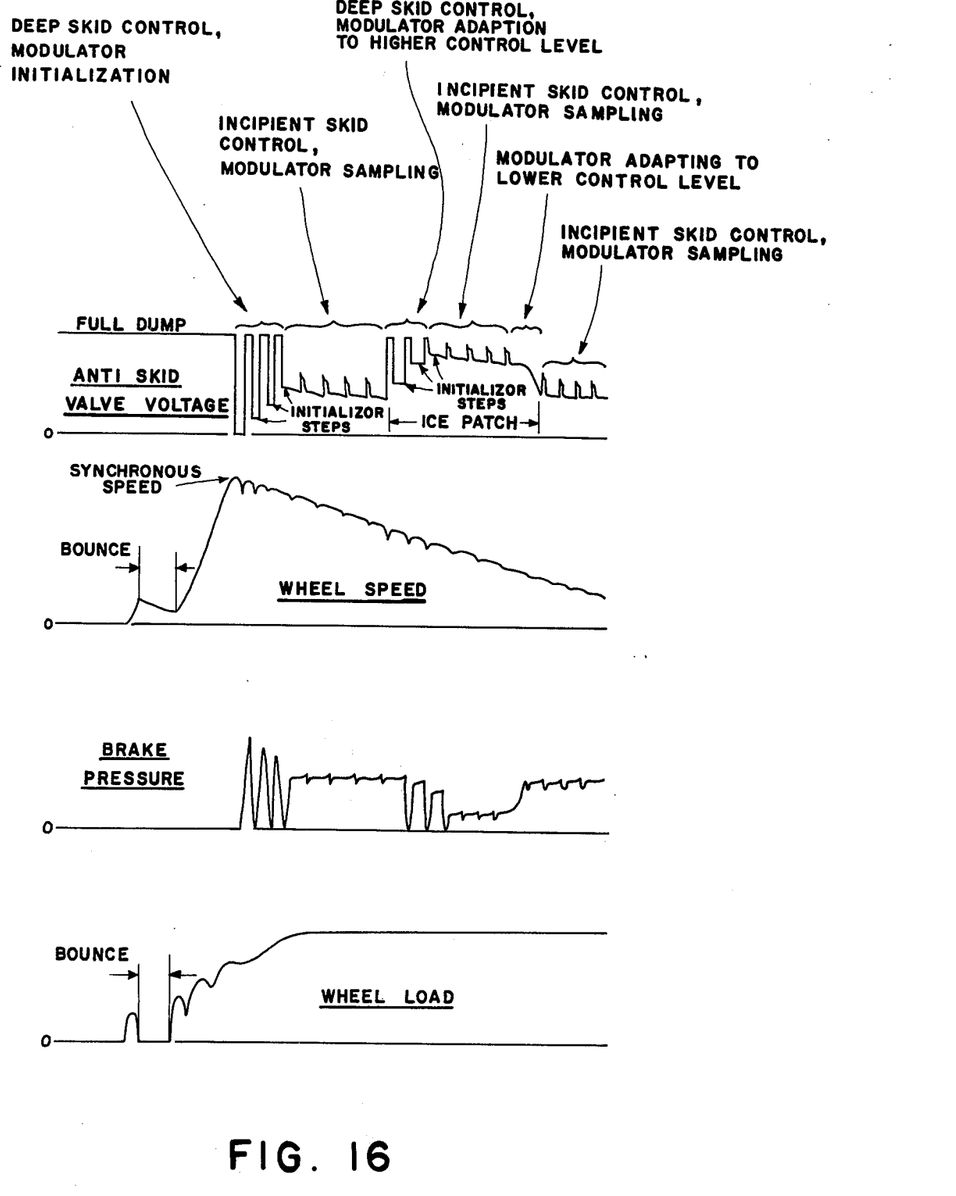
FIG. 16 is a graph showing the voltage applied to the control valve and the brake pressure in relation to wheel speed and wheel load.

The anti-lock logic circuit 70 provides locked wheel dumps and extensions to the dumps as required during wheel spin-up and for aircraft bounces. It also functions to disable the valve driver 48 at aircraft speeds below 12 mph.

The logic circuit operation is described by the logic equations given in the table appearing on FIG. 15. The strut switch signal is filtered and protected by resistors R301 and R302, capacitor C301, and diodes CR301 and CR302 to prevent electrical noise spikes from damaging the logic circuit. A delay circuit formed by resistor R308, capacitor C304, and diode CR310 insures that system shutdown will not occur for approximately 1 second after gate U304A changes to the "1" state. This delay insures that the aircraft is indeed below 10 mph and that no transient conditions can cause shutdown to occur.

While only the best known embodiments of the invention have been illustrated and described in detail herein, the invention is not limited thereto or thereby. Reference should therefore be had to the appended claims in determining the true scope of the invention.

What is claimed is:

1. An anti-skid control system for an aircraft having two main wheels, hydraulic braking means common with each main wheel, electrically controlled valve means regulating hydraulic pressure to the brake means, and wheel speed sensor means associated with each main wheel and generating an electrical signal proportional to wheel rotational velocity, comprising:
   first circuit means connected to the wheel speed sensor means for producing a first electrical signal when the rate of deceleration of either wheel exceeds a particular level;
   first and second skid detector circuits, one connected to each of the wheel speed sensor means and each producing a fixed level output signal constituting a second electrical signal;
   an initializer circuit connected to the skid detector circuits, receiving the output signals therefrom and creating an initialization signal;
   a modulator circuit connected to and receiving the output signals from the initializer circuit and creating an output signal, said modulator output signal having an amplitude directly related to the frequency of occurrence of said second electrical signal, and said amplitude being immediately increased upon the creation of said initialization signal;
   second circuit means connected to the wheel speed sensor means for producing a second electrical signal whenever either of the associated wheel velocities drops below a first level while the other wheel velocity remains above a second level; and
   valve driving circuit means interposed between the two said circuit means, modulator circuit and the electrically controlled valve means, and receiving and responding to the first and second electrical signals and the modulator output signals to regulate the hydraulic pressure of the brake means.

2. The anti-skid control system as recited in claim 1 wherein the first circuit means comprises:
   first and second deceleration circuits, one connected to each of the wheel speed sensor means, and producing outputs indicative of the rate of deceleration of the respective wheels,
   a variable deceleration reference signal source connected to the first and second skid detector circuits and producing a varying output signal level controllable by the first and second skid detector circuits; and
   a comparator circuit interconnected between the first and second deceleration circuits and the reference signal source and producing a fixed level output constituting said first electrical signal.

3. The anti-skid control system as recited in claim 1 wherein the valve driving circuit comprises a summing circuit interconnecting the first and second circuit means and the modulator and a valve current driver connected to and receiving an output voltage signal from the summing circuit and applying a current output signal proportional to said output voltage signal to the electrically controlled valve means.

4. An anti-skid control system for an aircraft having two main wheels, hydraulic braking means common with each main wheel, electrically controlled valve means regulating hydraulic pressure to the brake means, and wheel speed sensor means associated with each main wheel and generating an electrical signal proportional to wheel rotational velocity, comprising:
   first circuit means connected to the wheel speed sensor means for producing a first electrical signal when the rate of deceleration of either wheel exceeds a particular level;
   second circuit means connected to each of the wheel speed sensor means for producing a second electrical signal whenever either of the associated wheel velocities drops more than a certain amount below the ground speed of the aircraft;
   a locked wheel detector connected to the first circuit means producing an output signal when either of the associated wheel velocities drops below a first level;
   a locked wheel arming circuit connected to the first circuit means for producing an output signal when either of the associated wheel velocities exceeds a second level; and
   an anti-lock logic circuit connected to the locked wheel detector and locked wheel arming circuit and supplying a fixed amplitude output signal to the valve driver circuit when outputs from said locked wheel detector and arming circuits are coexistent.

5. The anti-skid control system as recited in claim 4 which further includes a spin-up detector circuit connected to the first circuit means and supplying a signal to the anti-lock logic circuit to maintain a full release of brake pressure from the time the aircraft touches down upon the runway and extended while either of the wheels associated with the first circuit means is accelerating.

6. The anti-skid control system as recited in claim 5 which further includes a bounce detector circuit connected to the first circuit means and presenting a signal to the anti-lock logic until both of the wheels have accelerated to a preselected velocity level.

7. The anti-skid control system as recited in claim 6 which further includes a ground sensing switch interconnected between the wheels and the anti-lock logic and presenting a signal to said logic when the aircraft is airborne to guarantee full hydraulic pressure release upon landing.

8. The anti-skid control system as recited in claim 6 wherein the anti-lock logic circuit is connected directly to the valve means and is operative to apply a signal to the valve means to disable the anti-skid circuitry at ground velocities below a particular level so as to allow taxiing maneuvers to be performed without anti-skid interference.

* * * * *

UNITED STATES PATENT OFFICE
CERTIFICATE OF CORRECTION

PATENT NO. : 3,880,475
DATED : April 29, 1975
INVENTOR(S) : Harold R Booher

It is certified that error appears in the above–identified patent and that said Letters Patent are hereby corrected as shown below:

Column 10, line 10, "ratio" should read --rate--.

Column 10, line 36, "second" should read --seconds--.

Signed and Sealed this second Day of September 1975

[SEAL]

Attest:

RUTH C. MASON
Attesting Officer

C. MARSHALL DANN
Commissioner of Patents and Trademarks